US008123322B1

(12) United States Patent
Paul et al.

(10) Patent No.: US 8,123,322 B1
(45) Date of Patent: Feb. 28, 2012

(54) MANUALLY OPERATED IMAGE TRANSLATION DEVICE

(75) Inventors: Ronald G. Paul, Corvallis, OR (US); Gregory F. Carlson, Corvallis, OR (US)

(73) Assignee: Marvell International Ltd., Hamilton (BM)

( * ) Notice: Subject to any disclaimer, the term of this patent is extended or adjusted under 35 U.S.C. 154(b) by 690 days.

(21) Appl. No.: 12/135,712

(22) Filed: Jun. 9, 2008

Related U.S. Application Data

(60) Provisional application No. 60/943,142, filed on Jun. 11, 2007.

(51) Int. Cl.
  *B41J 2/175* (2006.01)
  *B05C 17/10* (2006.01)
(52) U.S. Cl. .............................. 347/19; 347/5; 101/123

(58) Field of Classification Search .................. 347/5, 9, 347/16, 19; 101/123
See application file for complete search history.

(56) References Cited

U.S. PATENT DOCUMENTS

| | | | | |
|---|---|---|---|---|
| 4,648,317 A | * | 3/1987 | Bubley et al. | ................. 101/123 |
| 5,578,813 A | | 11/1996 | Allen et al. | |
| 5,627,570 A | * | 5/1997 | Hiramatsu et al. | ............. 347/19 |
| 5,927,872 A | | 7/1999 | Yamada | |

* cited by examiner

*Primary Examiner* — Lam S Nguyen

(57) ABSTRACT

Embodiments of the present invention provide apparatuses and methods related to a manually operated image translation device. The device may include a carriage, which houses image translation components, that is manually manipulated along a transverse member. An advancement arrangement may advance a medium when the image translation components clear an image translation zone of an adjacent medium. Other embodiments may be described and claimed.

6 Claims, 4 Drawing Sheets

MANUALLY OPERATED IMAGE TRANSLATION DEVICE

CROSS-REFERENCE TO RELATED APPLICATIONS

The present application claims priority to U.S. Provisional Patent Application No. 60/943,142, filed Jun. 11, 2007. The specification of said provisional application is hereby incorporated by reference in its entirety except for those sections, if any, that are inconsistent with this specification.

TECHNICAL FIELD

Embodiments of the present invention relate to the field of image translation and, in particular, to a manually operated image translation device.

BACKGROUND

Traditional printing devices rely on an electric motor to drive mechanics that advance a print head in a linear direction while another electric motor is used to drive mechanics that advance a print medium in an orthogonal direction. As the print head moves over the print medium an image may be laid down. Complex structures are needed to support these motors and associated drive mechanics. Furthermore, the motors have large power requirements.

Handheld printing devices have been developed that ostensibly allow an operator to manipulate a handheld device over a print medium in order to print an image onto the medium. However, these devices are challenged by the unpredictable and nonlinear movement of the device by the operator. The variations of operator movement make it difficult to determine the precise location of the print head. This type of positioning error may have deleterious effects on the quality of the printed image. This is especially the case for relatively large print jobs, as the positioning error may accumulate in a compounded manner over the entire print operation. Complicated and power-consuming electronics are used to address these issues with varying degrees of success.

SUMMARY

In some embodiments manually operated image translation device is disclosed. The device may comprise a carriage to house one or more image translation components; a transverse member to support the carriage and to allow the carriage to be manually manipulated along the transverse member in a first direction and a second direction; and an advancement arrangement to advance a medium a predetermined amount in a third direction, which is perpendicular to the first direction, upon the carriage being manually manipulated such that the one or more image translation components clear an image translation zone on the medium.

In some embodiment, the one or more image translation components may comprise a print head and/or a scan head.

The advancement arrangement may include a trigger that is engageable by the carriage when the carriage is manipulated to a first end of the transverse member; a roller assembly; and a clutch assembly to be driven by the carriage engaging the trigger and to drive the roller assembly to advance the medium.

In some embodiments, the advancement arrangement may include an electronic advancement sensor, disposed on the carriage, to detect the medium.

In some embodiments, the device may include a power supply; and a generator to charge the power supply based at least in part on manually manipulated motion of the carriage along the transverse member. The power supply may include a capacitor.

In some embodiments, the device may also include an image translation module to control the one or more image translation components to translate an image as the carriage is manually manipulated in the first direction and/or the second direction. A positioning arrangement may determine a location of the carriage on the transverse member; and the image translation module may control the one or more image translation components based at least in part on the determined location.

Embodiments of the present invention may also disclose a method for translating an image. The method may include charging a power supply by manually manipulating a carriage in first and second directions along a transverse member supporting the carriage, wherein the carriage houses one or more image translation components; receiving an indication that the power supply has received a sufficient charge to operate the one or more image translation components; and translating an image between the one or more image translation components and a medium adjacent to the one or more image translation components.

The method may involve manually manipulating the carriage in the first and second directions along the transverse member; determining that the carriage has been manipulated such that the one or more image translation components clear an image translation zone on the medium; and advancing, as a result of said determining, the medium in a third direction that is orthogonal to the first direction.

In some embodiments, determining that the one or more image translation components have cleared the image translation zone may include detecting for a presence of the medium adjacent to the image translation components with an electronic advancement sensor.

In some embodiments, advancing the medium may include engaging, with the carriage, an advancement detector disposed on an end support supporting the transverse member.

In some embodiments, translating the image may include determining a location of the carriage on the transverse member; and controlling the one or more image translation components to translate the image based at least in part on the determined location.

Embodiments of the present invention may also disclose other methods for translating an image. For example, in some embodiments, the method may include manually manipulating a carriage in first and second directions along a transverse member supporting the carriage, wherein the carriage houses one or more image translation components; detecting that the carriage has been manipulated such that the one or more image translation components clear an image translation zone on a medium; and advancing, as a result of said detecting, the medium in a third direction that is orthogonal to the first direction.

In some embodiments, method may include charging a power supply through said manually manipulating the carriage along the transverse member.

In some embodiments, the method may include translating an image between the one or more image translation components and the medium.

Embodiments of the present invention may disclose a manually operated image translation device having means for charging a power supply by a carriage being manually manipulated in first and second directions along a transverse member supporting the carriage, wherein the carriage houses one or more image translation components; means for receiving an indication that the power supply has received a sufficient charge to operate the one or more image translation components; and means for translating an image between the one or more image translation components and a medium adjacent to the one or more image translation components.

In some embodiments, the device may also include means for determining that the carriage has been manipulated such that the one or more image translation components clear an image translation zone on the medium; and means for advancing, as a result of said determining, the medium in a third direction that is orthogonal to the first direction.

The means for determining may include means for electronically detecting the medium.

In some embodiments, the device may also include means for determining a location of the carriage on the transverse member; and means for controlling the one or more image translation components to translate the image based at least in part on the determined location.

Other features that are considered as characteristic for embodiments of the present invention are set forth in the appended claims.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as left/right, up/down, back/front, and top/bottom. Such descriptions are merely used to facilitate the discussion and are not intended to restrict the application of embodiments of the present invention.

For the purposes of the present invention, the phrases "A/B" and "A and/or B" mean (A), (B), or (A and B). For the purposes of the present invention, the phrase "A, B, and/or C" means (A), (B), (C), (A and B), (A and C), (B and C), or (A, B, and C). For the purposes of the present invention, the phrase "(A)B" means (B) or (A and B), that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Figure 1:
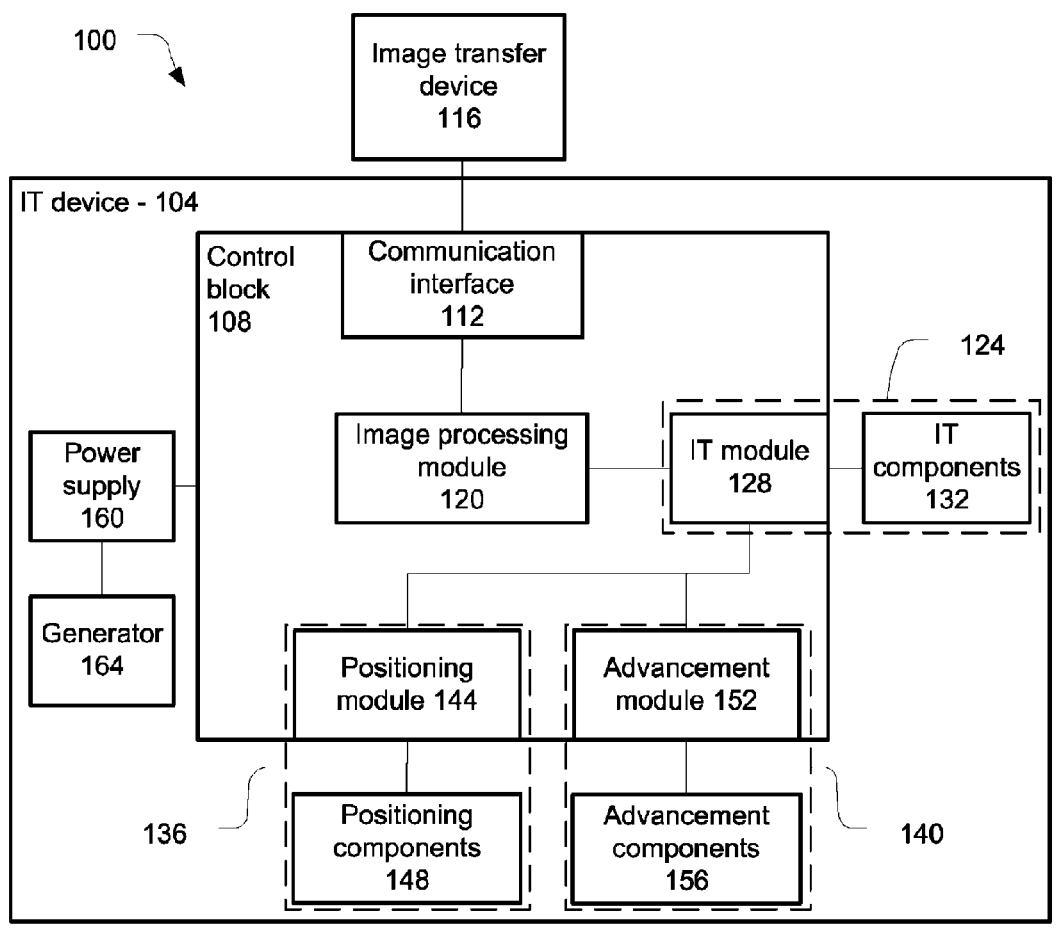
FIG. 1 is a schematic of a system including an image translation device in accordance with various embodiments of the present invention.

FIG. 1 is a schematic of a system 100 including a manually operated image translation device 104, hereinafter IT device 104, in accordance with various embodiments of the present invention. The IT device 104 may include components designed to facilitate efficient and reliable image translation through a low-cost package with little, if any, external power requirements. As will be appreciated, embodiments incorporating the teachings provided herein increase the portability and range of deployment alternatives for the IT device 104.

Image translation, as used herein, may refer to a translation of an image that exists in a particular context (e.g., medium) into an image in another context. For example, an image translation operation may be a scan operation. In this situation, a target image, e.g., an image that exists on a tangible medium, is scanned by the IT device 104 and an acquired image that corresponds to the target image is created and stored in memory of the IT device 104. For another example, an image translation operation may be a print operation. In this situation, an acquired image, e.g., an image as it exists in memory of the IT device 104, may be printed onto a print medium.

The IT device 104 may include a control block 108 with a communication interface 112 configured to communicatively couple the control block 108 to an image transfer device 116. The image transfer device 116 may be any type of device capable of communicating data related to an image translation operation. This may include, for example, transmitting a print image to the IT device 104 and/or receiving a scanned image from the image transfer device 116. The image transfer device 116 may include a general purpose computing device, e.g., a desktop computing device, a laptop computing device, a mobile computing device, a personal digital assistant, a cellular phone, etc. or it may be a removable storage device, e.g., a flash memory data storage device, designed to store data such as image data. If the image transfer device 116 is a removable storage device, e.g., a universal serial bus (USB) storage device, a flash memory card, etc., the communication interface 112 may include an appropriate port for receiving the storage device. In some embodiments, the communication interface 112 may include multiple interfaces. This may allow, e.g., IT data to be transferred between a removable storage device and a host computing device that are both coupled to the IT device 104.

The communication interface 112 may include a wireless transceiver to allow the communicative coupling with the image transfer device 116 to take place over a wireless link. The image data may be wirelessly transmitted over the link through the modulation of electromagnetic waves with frequencies in the radio, infrared or microwave spectrums.

A wireless link may contribute to the mobility and versatility of the IT device 104. However, some embodiments may additionally/alternatively include a wired link communicatively coupling the image transfer device 116 to the communication interface 112. In some embodiments, a wired link may provide power to the IT device 104, which may allow the IT device 104 to boot up components, e.g., a processing unit and firmware, sufficient to detect that an IT job is pending, do basic (or advanced) bidirectional communications, internal processing and buffering of IT data, and/or power a status light emitting device (LED) on the IT device 104.

In some embodiments, the communication interface 112 may communicate with the image transfer device 116 through one or more wired and/or wireless networks including, but not limited to, personal area networks, local area networks, wide area networks, metropolitan area networks, etc. The data transmission may be done in a manner compatible with any of a number of standards and/or specifications including, but not limited to, 802.11, 802.16, Bluetooth, Global System for Mobile Communications (GSM), code-division multiple access (CDMA), Ethernet, etc.

The control block 108 may also include an image processing module 120 coupled to an IT arrangement 124, which may include an IT module 128 to control one or more IT components 132, to perform image processing techniques involved in image translation operations. If the image translation operation includes a print operation, the image processing module 120 may receive a print image from the communication interface 112, process the image in order to facilitate the upcoming print operation, and provide the processed image to the IT arrangement 124 for printing. If the image translation operation includes a scan operation, the image processing module 120 may receive scanned surface images of an adjacent medium, e.g., component images, from the IT arrangement 124 and process the component images into a composite image. The composite image may be subsequently transmitted via the communication interface 112 to the image transfer device 116. The composite image may be additionally/alternatively stored locally by the IT device 104 for subsequent review, transmittal, printing, etc.

In various embodiments some or all of these image processing operations may be performed by the image transfer device 116 or another device.

The IT arrangement 124 may be coupled to a positioning arrangement 136 and an advancement arrangement 140 to cooperatively operate to complete an image translation operation. The positioning arrangement 136 may include a positioning module 144 coupled to one or more positioning components 148. Similarly, the advancement arrangement 140 may include an advancement module 152 coupled to one or more advancement components 156. In some embodiments, the advancement arrangement 140 may be a purely mechanical arrangement and, therefore, may not need the advancement module 152 to control operation of the advancement components 156. The structure and functionality of these arrangements will be discussed in further detail with respect to FIG. 2.

The IT device 104 may include a power supply 160 coupled to the control block 108 to source power to the various components. The IT device 104 may also include a generator 164 to convert kinetic energy resulting from manually manipulated motion of the IT device 104, or its components, into electrical energy for charging the power supply 160. The power supply 160 may be a mobile power supply including, but not limited to, a capacitor, a battery, a solar power supply, etc. In other embodiments the power supply 160 may additionally/alternatively regulate power provided by another component (e.g., the image transfer device 116, a power cord coupled to an alternating current (AC) outlet, etc.).

Figure 2:
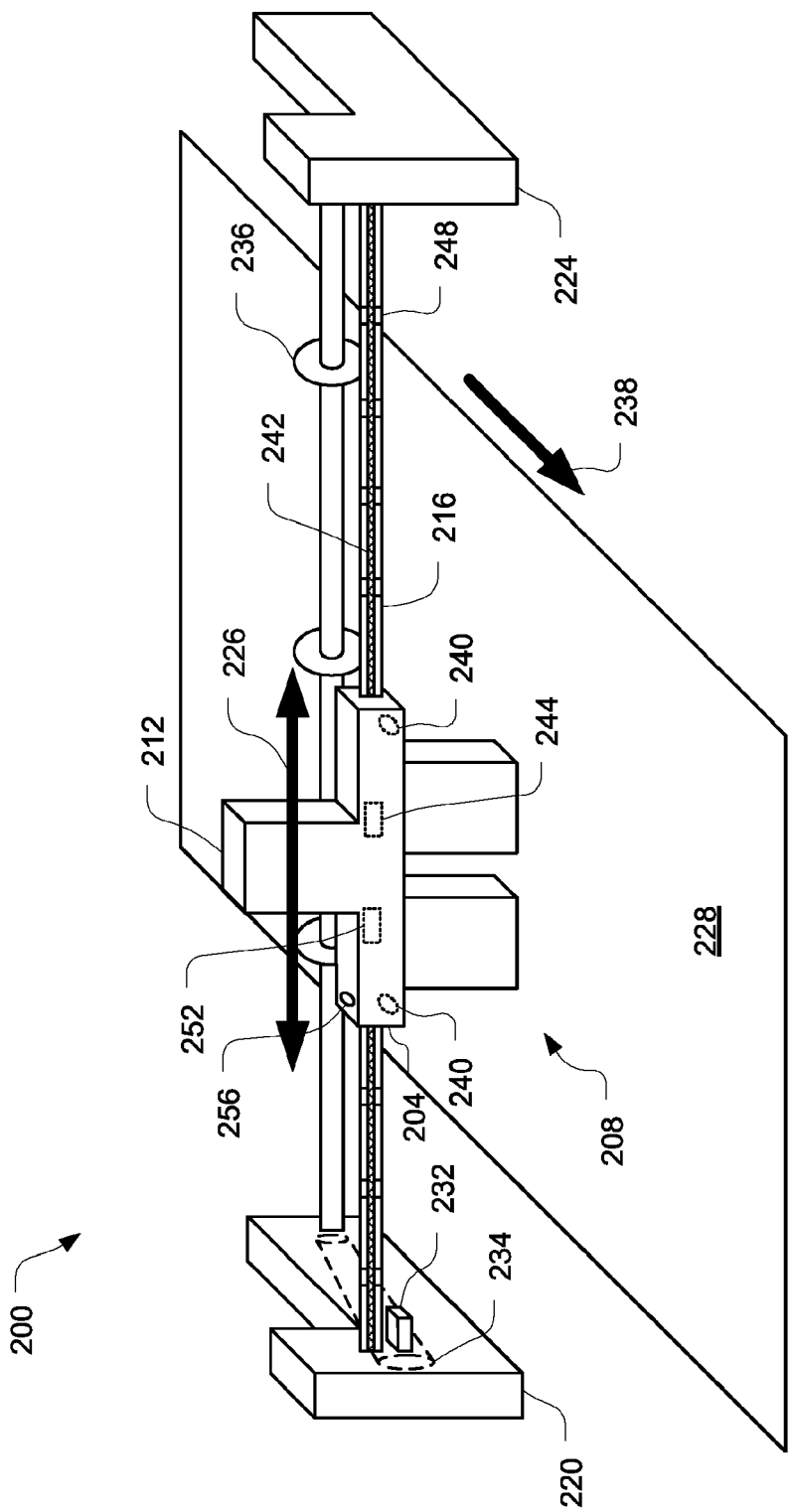
FIG. 2 is a perspective view of an image translation device in accordance with various embodiments of the present invention.

FIG. 2 is a perspective view of an IT device 200 in accordance with various embodiments of the present invention. The IT device 200 may be similar to IT device 104 with like-named parts being substantially interchangeable.

The IT device 200 may include a carriage 204 configured to house IT components 208, e.g., one or more print heads and/or one or more scan heads.

Print heads may be inkjet print heads having a plurality of nozzles designed to emit liquid ink droplets. The ink, which may be contained in reservoirs/cartridges, may be black and/or any of a number of various colors. A common, full-color inkjet print head may have nozzles for cyan, magenta, yellow, and black ink. Other embodiments may utilize other printing techniques, e.g., toner-based printers such as laser or light-emitting diode (LED) printers, solid ink printers, dye-sublimation printers, inkless printers, etc.

Scan heads may include one or more optical imaging sensors designed to capture a plurality of component images of an adjacent medium. In an embodiment in which the IT device 200 is capable of scanning full color images, the optical imaging sensors may have the sensor elements designed to scan different colors.

The carriage 204 may have a handle 212 and may be supported by a transverse member, e.g., rod 216, which extends between a first end support 220 and a second end support 224. An operator may engage the handle 212 and manually manipulate the carriage 204 along the rod 216 in directions 226. As the carriage 204 is manipulated along the rod 216 the IT components 208 may print/scan along a swath of an adjacent medium 228.

The IT device 200 may include an advancement arrangement configured to determine when the carriage 204 has been manipulated such that the IT components 208 have cleared an IT zone on the medium 228. The IT zone may refer to the area of the medium involved in the translation of an image. The IT zone may correspond to the entire medium 228, e.g., the borders of the IT zone may correspond to the left/right edges of the medium 228, or some subset thereof.

In various embodiments, the advancement arrangement may be a mechanical structure, an electrical structure, or some combination thereof.

An advancement arrangement having a mechanical structure may include advancement components such as a trigger 232 that is engageable by the carriage 204 when the carriage 204 is at the left end of the rod 216. A clutch assembly 234 of the advancement components may be disposed within the end support 220 and may be driven by the carriage 204 engaging, e.g., depressing, the trigger 232. The clutch assembly 234 may, in turn, drive other advancement components, e.g., roller assembly 236, configured to advance the medium 228 in a direction 238, which is orthogonal to the directions 226, by an amount that corresponds to a swath width. Thus, the mechanical energy used to depress the trigger 232 is directly transferred to the roller assembly 236 obviating the use of an electric motor to drive the advancement mechanics.

An advancement arrangement having an electrical structure may include an electronic advancement sensor to determine when the IT components 208 clear the IT zone. An electronic advancement sensor may include medium sensors 240 configured to detect when the IT components 208 clear the medium 228. Other electronic advancement sensors may be used in other embodiments. For example, a proximity sensor may be used to detect proximity of the carriage 204 to the end support 220, positioning sensors, which may also be a part of a positioning arrangement, may be used to detect the position of the carriage 204 on the rod 216, etc.

The roller assembly 236 may be driven by an electric motor to advance the medium 228 when the electronic advancement sensor determines that the IT components 208 have cleared the IT zone.

The advancement arrangement may be configured to determine when the IT components 208 clear the left side of the IT zone, the right side of the IT zone, or both (which may allow for bi-directional printing). An embodiment where the advancement components are only configured to determine when the IT components 208 clear one side of the IT zone may be useful when more than one swipe over a particular portion of the medium 228 is desired to complete the printing/scanning of that swath.

In various embodiments, the advancement arrangement may be configured to accommodate any number of swipes of the carriage 204 before advancing the medium 228.

In some embodiments, one or more electrical homing sensors may be used to home the carriage position, e.g., facilitate a determination of a home position of the carriage 204 upon startup of the IT device 200. The homing sensors may be disposed in the carriage 204, the end support 220, and/or the end support 224. The homing sensor(s) may be triggered when the carriage 204 advances to the leftmost position and the rightmost position along the rod 216, which may allow for a respective determination of the left and right edges of the IT zone. The homing sensor(s) may be part of, separate from, and/or used in conjunction with components of the advancement arrangement.

The IT device 200 may also include positioning components such as an encoder strip 242, disposed along a length of the rod 216, and a corresponding detector 244 disposed on the carriage 204. The positioning components may provide feedback to a positioning module that may be used to determine positioning information indicative of the precise location of the carriage 204 on the rod 216. This information may be extrapolated to determine the location of the IT components 208 with respect to the medium 228. This positioning information may be used by an IT module of the IT device 200 for various image translation operations. For example, in a print operation the IT module may receive the positioning information, coordinate it to a portion of the processed image, and control a print head in a manner to deposit a printing substance on the medium 228 to represent the corresponding portion of the processed image.

The IT device 200 may also have a generator to charge a power supply from the manually manipulated motion of the carriage 204 along the transverse member. The generator may have components 248 disposed in the rod 216 and a corresponding component 252 disposed in the carriage 204. The generator may convert the kinetic energy of the carriage 204 to electrical energy through electromagnetic induction.

The IT device 200 may have a charge indicator 256 to provide an indication that the power supply has a sufficient charge to operate the IT arrangement and/or other elements of the IT device 200.

Figure 3:
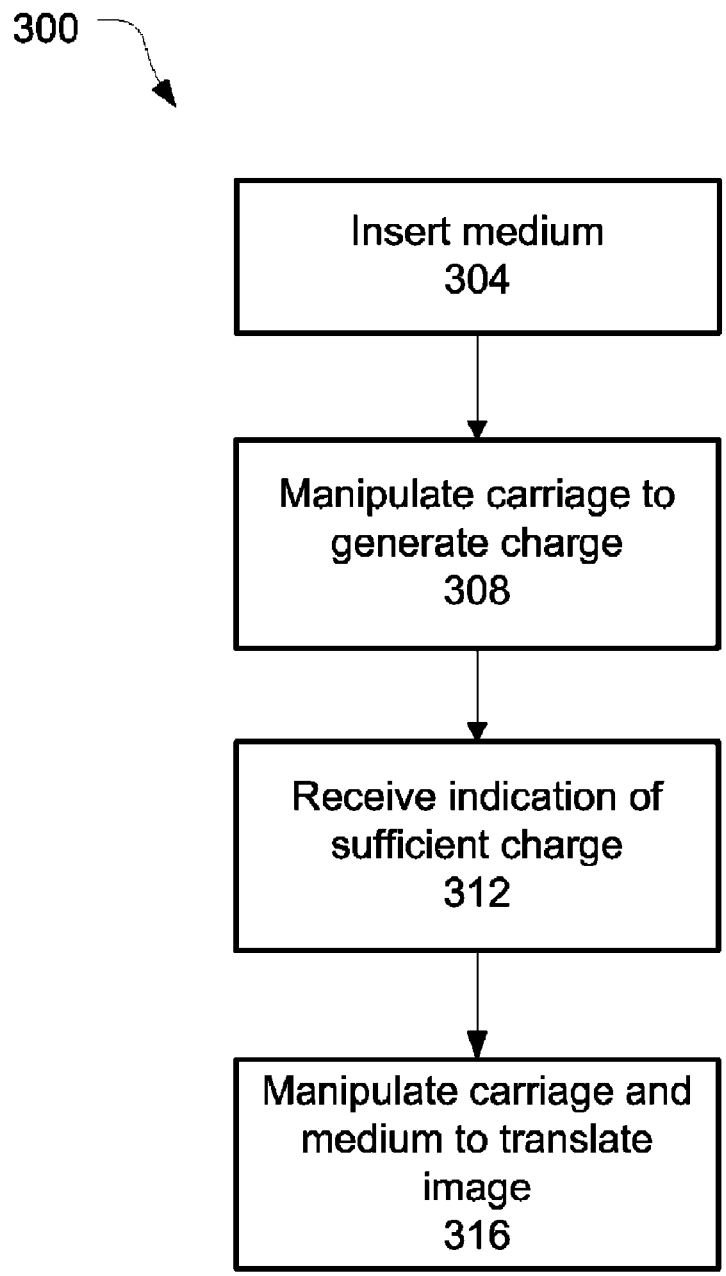
FIG. 3 is flow diagram depicting an image translation operation in accordance with various embodiments of the present invention.

FIG. 3 is a flowchart 300 illustrating an IT operation of the IT device 200 in accordance with various embodiments of the present invention. At block 304 the medium 228 may be positioned under the roller assembly 236 of the IT device 200. At block 308 an operator may manipulate the carriage 204 back and forth along the rod 216 to generate an initial charge sufficient to power the various components of the IT device 200. In some embodiments the operator may charge the power supply by restricting motion of the carriage 204 to the central portion of the rod 216, thereby avoiding advancement of the medium 228 before the power supply has sufficient charge to operate the IT components. In some embodiments, the advancement arrangement may be configured to automatically delay advancement until the power supply is sufficiently charged.

At block 312, the operator (or the advancement arrangement) may receive an indication from the charge indicator 256 that the power supply has a sufficient charge. At block 316, the operator may manipulate the carriage along the full length of the rod 216 while the advancement arrangement manipulates the medium to perform the print/scan operation.

Figure 4:
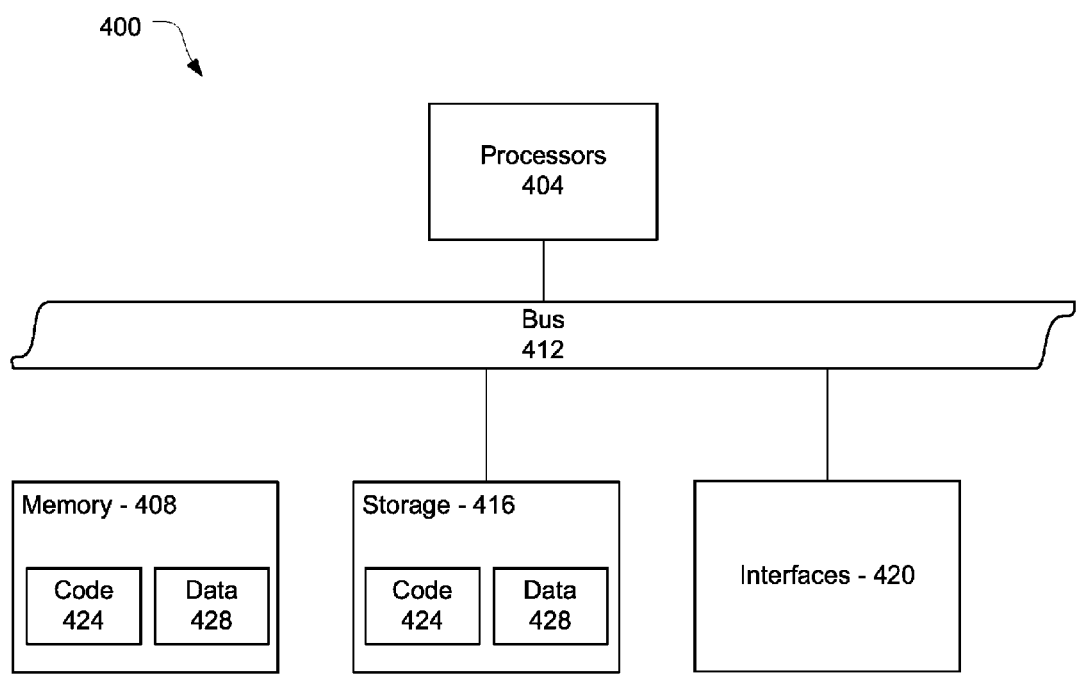
FIG. 4 is a schematic of a computing device capable of implementing a control block of an image translation device in accordance with various embodiments of the present invention.

FIG. 4 schematically illustrates a computing device 400 capable of implementing a control block, e.g., control block 108, in accordance with various embodiments. As illustrated, for the embodiments, computing device 400 includes one or more processors 404, memory 408, and bus 412, coupled to each other as shown. Additionally, computing device 400 includes storage 416, and one or more interfaces 420 coupled to each other, and the earlier described elements as shown. The components of the computing device 400 may be designed to provide the IT functions of a control block of an IT device as described herein.

Memory 408 and storage 416 may include, in particular, temporal and persistent copies of code 424 and data 428, respectively. The code 424 may include instructions that when accessed by the processors 404 result in the computing device 400 performing operations as described in conjunction with various modules of the control block in accordance with embodiments of this invention. The processing data 428 may include data to be acted upon by the instructions of the code 424. In particular, the accessing of the code 424 and data 428 by the processors 404 may facilitate IT operations as described herein.

The processors 404 may include one or more single-core processors, multiple-core processors, controllers, application-specific integrated circuits (ASICs), etc.

The memory 408 may include random access memory (RAM), dynamic RAM (DRAM), static RAM (SRAM), synchronous DRAM (SDRAM), dual-data rate RAM (DDRRAM), etc.

The storage 416 may include integrated and/or peripheral storage devices, such as, but not limited to, disks and associated drives (e.g., magnetic, optical), USB storage devices and associated ports, flash memory, read-only memory (ROM), non-volatile semiconductor devices, etc. Storage 416 may be a storage resource physically part of the computing device 400 or it may be accessible by, but not necessarily a part of, the computing device 400. For example, the storage 416 may be accessed by the computing device 400 over a network.

The interfaces 420 may include interfaces designed to communicate with peripheral hardware, e.g., IT components 132, positioning components 148, advancement components 156, etc., and/or remote devices, e.g., image transfer device 116.

In various embodiments, computing device 400 may have more or less elements and/or different architectures.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments illustrated and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. An apparatus comprising:
a carriage to house one or more image translation components;
a transverse member to (i) support the carriage and (ii) allow the carriage to be manually manipulated along the transverse member in a first direction and a second direction; and
an advancement arrangement to advance a medium a predetermined amount in a third direction, which is perpendicular to the first direction, upon the carriage being manually manipulated such that the one or more image translation components clear an image translation zone on the medium, wherein the advancement arrangement includes
a trigger that is engageable by the carriage when the carriage is manipulated to move to a first end of the transverse member,
a roller assembly, and
a clutch assembly,
wherein the carriage is configured to engage the trigger by depressing the trigger, to transfer a moving energy of the carriage to the engaged trigger,
wherein the engaged trigger is configured to convert the moving energy, which is transferred from the carriage, to a drive energy to drive the clutch assembly, and
wherein the clutch assembly is configured to use the drive energy to drive the roller assembly to advance the medium.

2. The apparatus of claim 1, wherein the one or more image translation components comprise at least one of a print head and/or a scan head.

3. The apparatus of claim 1, wherein the advancement arrangement includes an electronic advancement sensor, disposed on the carriage, to detect the medium.

4. The apparatus of claim 1, further comprising:
an image translation module to control the one or more image translation components to translate an image as the carriage is manually manipulated in at least one of the first direction and the second direction.

5. A method comprising:
manually manipulating a carriage in a first direction and a second direction along a transverse member supporting the carriage, wherein the carriage houses one or more image translation components;
detecting that the carriage has been manipulated such that the one or more image translation components clear an image translation zone on a medium; and
advancing, as a result of said detecting, the medium in a third direction that is orthogonal to the first direction, wherein said advancing further comprises
engaging a trigger by the carriage when the carriage is manipulated to a first end of the transverse member, wherein said engaging the trigger comprises (i) depressing the trigger by the carriage and (ii) transferring a moving energy of the carriage to the trigger,
in response to engaging the trigger, driving, by the engaged trigger, a clutch assembly, wherein driving the clutch assembly further comprises converting the moving energy, which is transferred from the carriage to the trigger, to a drive energy to drive the clutch assembly, and
driving, by the clutch assembly using the drive energy, a roller assembly to advance the medium.

6. The method of claim 5, further comprising:
translating an image between the one or more image translation components and the medium.

* * * * *